United States Patent [19]
Seyferth et al.

[11] 3,717,660
[45] Feb. 20, 1973

[54] REACTION OF PHENYL(BROMODICHLOROMETHYL) MERCURY AND THE PREPARATION OF PERCHLOROTHIIRANE

[75] Inventors: Dietmar Seyferth, Lexington, Mass.; Wolfgang Tronich, 8700 Wurzburg, Germany

[73] Assignee: Massachusetts Institute of Technology, Cambridge, Mass.

[22] Filed: April 8, 1970

[21] Appl. No.: 26,799

[52] U.S. Cl. ............... 260/327 E, 252/8.1, 260/79.7, 424/275
[51] Int. Cl. ............................................. C07d 59/00
[58] Field of Search .................................. 260/327 E

[56] References Cited

UNITED STATES PATENTS 3,136,744   6/1964   McGrew..................................260/79

Primary Examiner—John D. Randolph
Assistant Examiner—Cecilia M. S. Jaisle
Attorney—Thomas Cooch, Arthur A. Smith, Jr. and L. William Bertelsen

[57] ABSTRACT

The reaction of phenyl (trihalo) mercury with elemental sulfur or carbon double bond sulfur substances produces thiiranes in improved yields. A novel compound useful as an insecticide, as a vulcanization agent, as a substance for the introduction of flame proofing, and as a polymer intermediate for polythioethylene polymers, is described.

3 Claims, No Drawings

REACTION OF PHENYL(BROMODICHLOROMETHYL) MERCURY AND THE PREPARATION OF PERCHLOROTHIIRANE

This invention provides an improved method for making thiiranes. We have discovered that reactions of elemental sulfur or $R_2C=S$ substances (R=Cl, or phenyl) with phenyl (bromodichloromethyl) mercury yield thiiranes in high yields, one such thiirane is a new composition of matter, perchlorothiirane.

PRIOR ART

In all previous preparations of thiiranes at least one of the reactants contained a diazoalkane group.[1-3] ([1]H.Staudinger & J.Siegart, Lv. Chim. Acta., 3, 840 (1920). [2]A.Schönberg, "Methoden der organischen Chemie" (Houben-Weyl), Vol.IX, p.158, 734, G.Thieme Verlag, Stuttgart, 1955. A.Schönberg & E. Friese, Chem. Ber., 96, 2420 (1963). W.J.Middleton & W.H.Sharkey, J. Org. Chem., 30, 1384 (1965). [3]N.Latif & I.Fathy, J. Org. Chem., 27, 1633 (1962).) The reaction of diazoalkanes with thiophosgene and thioketones was reported by Staudinger and Siegart nearly 40 years ago:

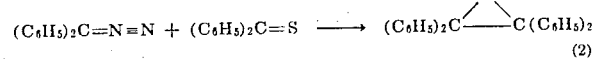

More recently the preparation of thiiranes by reaction of diazoalkanes with elemental sulfur has been reported by Egyptian workers.[3]

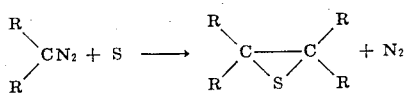

We have discovered that thiiranes may be produced by reacting phenyl (bromodichloromethyl) mercury with elemental S or with C=S compounds in a convenient, inexpensive and high yield synthesis; the reaction also produces the novel substance perchlorothiirane already described.

Three examples of preferred embodiments of the invention follow:

EXAMPLE I

A 3-neck round bottom flask equipped with mechanical stirrer, a thermometer and a reflux condenser topped by a nitrogen inlet tube is charged with 2.38 grams (10 mole) of phenyl (bromodichloromethyl) mercury 0.16 grams (5 mg atoms) of sulfur and 30 ml of dry benzene. The reaction proceeds under nitrogen to the exclusion of air at 70°C for one hour and results in the formation of phenyl-mercuric bromide in 93 percent yield. The reaction mixture was filtered and the filtrate (yellow in color) concentrated in a rotary evaporator at 14 mm to remove solvent. The concentrate was then redistilled by trap-to-trap distillation in vacuo. The end product is not the expected thiophosgene but rather a new substance 2, 2, 3, 3,-tetrachloro-1-thiirane (perchlorothiirane) a colorless, malodorous liquid, boiling point 36°-38°C at 0.1 mm Hg, which is stable at room temperature for moderate lengths of time. Greater than 90 percent yield of perchlorothiirane can be so obtained by careful distillation. The total reaction appears to involve two steps with thiophosgene being an intermediate which later reacts to form the new product, perchlorothiirane. These two reactions are indicated below:

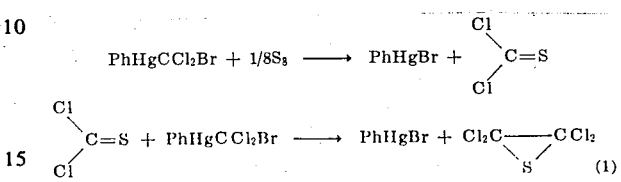

EXAMPLE II

In this example the procedure of Example I was followed except that thiophosgene was substituted for sulfur, to illustrate that perchlorothiirane formed by the reaction of phenyl (bromodichloromethyl) mercury with sulfur, as illustrated in the previous example, can also be effected by the reaction of phenyl (bromodichloromethyl) mercury with thiophosgene, which is apparently an intermediate in the first reaction given in Example I. Thus, 6.43 grams (27 mmoles) of phenyl (bromodichloromethyl) mercury and 1.67 grams thiophosgene (27 mmoles) were reacted under nitrogen in benzene for three days. The yields of phenylmercuric bromide and perchlorothiirane were 93 percent and 36 percent respectively.

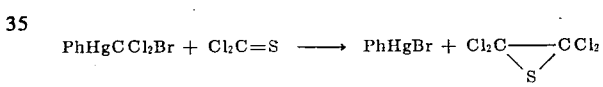

EXAMPLE III

We followed the procedure of Examples I and II with the exception that sulfur and thiophosgene were replaced with thiobenzophenone. 2.238 grams of phenyl (bromodichloromethyl) mercury (10 mmole) was reacted with 1.82 grams (10 mmoles) of thiobenzophenone in benzene for three hours at 70°C under nitrogen. The resulting product was the known 2, 2-dichloro-3, 3-diphenyl-1-thiirane, melting point 88.5°–89.5°C in 75 percent yield. The reaction was the following:

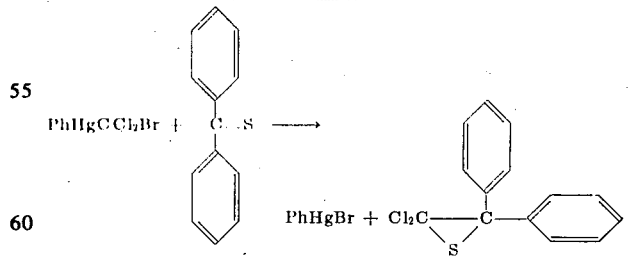

The tight 3-ring sulfur compounds formed in accordance with this invention are useful in the manufacture of homopolymers. Polymerization may be effected by heating the thiiranes in the presence of a base to produce linear polymers generally similar to those described by McGrew U.S. Pat. No. 3,136,744. The procedures and utilities described by McGrew are generally applicable to the thiiranes herein described.

Although the invention has been described with specific reference to the use of phenyl (bromodichloromethyl) mercury, it is contemplated that other phenyl (trihalo methyl) mercury compounds are also useful in carrying out reactions herein described, and may be used in the practice of the invention. Similarly, in addition to the thiophosgene and thiobenzophenone, described above, it is anticipated that other thiocarbonyl compounds of type $R_2C=S$ where R is acyl, substituted acyl, alkyl, substituted alkyl or halogen, may also be used in the practice of the invention.

Having thus disclosed our invention and described in detail preferred embodiments thereof, we claim and desire to secure letters patent:

1. The method of making thiiranes comprising reaction a phenyl (trihalomethyl) mercury compound with sulfur or a compound of the formula $$R-\overset{\overset{\displaystyle S}{\|}}{C}-R$$

wherein R is chloro or phenyl.

2. The method defined by claim 1 wherein the phenyl (trihalomethyl) mercury compound is phenyl (bromodichloromethyl) mercury.

3. The method defined by claim 1 wherein the phenyl (trihalomethyl) mercury compound is phenyl bromodichloromethyl mercury which is reacted with sulfur.

* * * * *